United States Patent
Patterson et al.

(10) Patent No.: US 7,911,877 B2
(45) Date of Patent: Mar. 22, 2011

(54) ACTIVE NOISE CANCELLATION THROUGH THE USE OF MAGNETIC COUPLING

(75) Inventors: Douglas J. Patterson, Spring, TX (US); Xiao Ming Tang, Sugar Land, TX (US); Alexei Bolshakov, Pearland, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 12/646,694

(22) Filed: Dec. 23, 2009

(65) Prior Publication Data

US 2010/0097887 A1 Apr. 22, 2010

Related U.S. Application Data

(62) Division of application No. 11/445,075, filed on May 31, 2006, now Pat. No. 7,639,562.

(51) Int. Cl.
*G01V 1/00* (2006.01)
(52) U.S. Cl. .......................... 367/35; 181/105
(58) Field of Classification Search ............. 367/25, 367/34, 35; 181/105, 401; 166/66.5
See application file for complete search history.

(56) References Cited

U.S. PATENT DOCUMENTS

| | | | |
|---|---|---|---|
| 3,067,404 A | 12/1962 | Hildebrandt | |
| 3,277,363 A * | 10/1966 | Schuster | 324/323 |
| 3,321,625 A | 5/1967 | Wahl | |
| 4,028,546 A | 6/1977 | Peelman et al. | |
| 4,210,967 A | 7/1980 | Ingram | |
| 4,367,541 A | 1/1983 | Seeman | |
| 4,402,068 A | 8/1983 | Angehrn | |
| 4,446,539 A * | 5/1984 | von Bose | 367/25 |
| 4,551,823 A | 11/1985 | Carmichael et al. | |
| 4,698,793 A | 10/1987 | Wu | |
| 4,700,803 A | 10/1987 | Mallett et al. | |
| 4,703,460 A * | 10/1987 | Kurkjian et al. | 367/31 |
| 4,796,237 A | 1/1989 | Hutchens et al. | |
| 4,852,067 A | 7/1989 | White | |
| 4,893,285 A | 1/1990 | Masson et al. | |
| 4,953,136 A * | 8/1990 | Kamata et al. | 367/25 |
| 4,953,399 A | 9/1990 | Fertl et al. | |
| 5,038,107 A | 8/1991 | Gianzero et al. | |
| 5,047,992 A | 9/1991 | Howlett | |
| 5,229,554 A | 7/1993 | Cole | |
| 5,245,586 A | 9/1993 | Hassler | |
| 5,274,604 A | 12/1993 | D'Angelo et al. | |
| 5,452,761 A | 9/1995 | Beard et al. | |

(Continued)

FOREIGN PATENT DOCUMENTS

GB 2253054 A 8/1992

(Continued)

OTHER PUBLICATIONS

McClellan; Two-Dimensional Spectrum Analysis in Sonic Logging, IEEE ASSP Magazine, Jul. 1986, pp. 12-18.

*Primary Examiner* — Jack Keith
*Assistant Examiner* — Krystine Breier
(74) *Attorney, Agent, or Firm* — Mossman Kumar & Tyler PC

(57) ABSTRACT

Passive suppression of casing signals is used to improve the ability to measure formation velocities. Passive suppression includes the use of a magnet slidably coupled to the casing.

8 Claims, 9 Drawing Sheets

U.S. PATENT DOCUMENTS

| | | |
|---|---|---|
| 5,541,890 A | 7/1996 | Tang |
| 5,763,773 A | 6/1998 | Birchak et al. |
| 5,780,784 A | 7/1998 | Robbins |
| 5,886,303 A | 3/1999 | Rodney |
| 6,023,443 A | 2/2000 | Dubinsky et al. |
| 6,069,560 A * | 5/2000 | Larsson ................. 340/540 |
| 6,179,084 B1 | 1/2001 | Yamamoto et al. |
| 6,188,643 B1 | 2/2001 | Liang et al. |
| 6,595,285 B2 | 7/2003 | Dubois et al. |
| 6,615,949 B1 * | 9/2003 | Egerev et al. ............... 181/102 |
| 6,727,705 B2 | 4/2004 | Frey et al. |
| 6,850,168 B2 | 2/2005 | Tang et al. |
| 6,850,462 B2 | 2/2005 | McDaniel et al. |
| 6,868,341 B2 | 3/2005 | Valero |
| 6,930,616 B2 | 8/2005 | Tang et al. |
| 7,048,089 B2 | 5/2006 | West et al. |
| 7,150,317 B2 | 12/2006 | Barolak et al. |
| 2003/0025639 A1 | 2/2003 | Rodney et al. |
| 2004/0113627 A1 | 6/2004 | West et al. |
| 2005/0205268 A1 | 9/2005 | Engels et al. |
| 2005/0259516 A1 | 11/2005 | Ray et al. |
| 2006/0287830 A1 | 12/2006 | Tang |

FOREIGN PATENT DOCUMENTS

| | | |
|---|---|---|
| GB | 2356209 A | 5/2001 |
| GB | 2381847 A | 5/2003 |

* cited by examiner

ACTIVE NOISE CANCELLATION THROUGH THE USE OF MAGNETIC COUPLING

CROSS-REFERENCES TO RELATED APPLICATIONS

This application is a Divisional application of U.S. application Ser. No. 11/445,075, now U.S. Pat. No. 7,639,562.

FIELD OF THE DISCLOSURE

The present disclosure is related to the field of acoustic wellbore logging. More specifically, the present disclosure is related to apparatus and methods for reducing ringing in cased wellbores.

BACKGROUND OF THE ART

Acoustic array wellbore logging tools are known in the art for determining acoustic properties of earth formations penetrated by a wellbore. The array acoustic wellbore logging tools known in the art typically include an energy emitting transducer, called a transmitter, and a plurality of receiving transducers, called receivers, axially spaced apart from the transmitter along an elongated tool mandrel. The tool is typically lowered into the wellbore at one end of an armored electrical cable. The transmitter periodically energizes the wellbore with pulses of acoustic energy. The acoustic energy travels through a fluid filling the wellbore and interacts with the interface between the fluid and the wall of the wellbore. Some of the acoustic energy can then travel along the wellbore wall. After traveling along the wall of the wellbore, some of the energy can travel back into the wellbore towards the tool where it can be detected by the receivers. The receivers convert the acoustic energy into electrical signals having amplitudes corresponding to the acoustic energy amplitude.

A commonly used method for analysis of the acoustic signals is the so-called semblance technique. For example, a method which is known in the an for determining acoustic transmission velocity of the formation, the method being called semblance correlation, comprises determining values of time difference between the signals from each of the receivers at which the degree of correspondence between the signals reaches a maximum. The time difference is then used to calculate a formation acoustic velocity since the distances between the receivers are known. See, for example, U.S. Pat. No. 4,594,691 to Kimball et al., U.S. Pat. No. 5,541,890 to Tang, U.S. Pat. No. 6,023,443 to Dubinsky et al., U.S. Pat. No. 6,930,616 to Tang et al.

In a cased hole environment, the presence of the casing often prevents the measurement of the formation compressional wave slowness especially when the casing is poorly bonded. This is due to the fact that when an acoustic source is activated, the casing will ring. The ringing signal propagates with substantially no attenuation and will overwhelm m the formation arrival. If, on the other hand, the casing is well bonded to the formation, the ringing of the casing is not an issue. The present disclosure is a method of determination of formation compressional and shear-wave velocities in a cased borehole.

SUMMARY OF THE DISCLOSURE

One embodiment of the disclosure is an apparatus for evaluating an earth formation having a cased borehole. An acoustic transmitter on a logging tool conveyed in the borehole generates an acoustic signal that propagates through casing and through the formation. A receiver on the logging tool responds to the casing signal and the formation signal. A device on the logging tool disposed between the transmitter and the receiver suppresses the casing signal at the receiver. The device may include a magnet slidably coupled to the casing so as to increase a casing density between the transmitter and the receiver. The device may include segments having different diameters and/or at least an attached mass. The transmitter may be a quadrupole transmitter operated below a cut-off frequency of the casing. The device may include a sensor that produces an output indicative of the casing signal and a transducer that produces an output that suppresses the casing signal using the output of the sensor. A plurality of receivers may be used with a processor that estimates a compressional-wave velocity and/or a shear-wave velocity of the formation using the output of the plurality of receivers.

Another embodiment of the disclosure is a method of evaluating an earth formation having a cased borehole. An acoustic signal is generated that propagates through the casing and the formation using a transmitter on a logging tool. A receiver on the logging tool produces an output responsive to the casing signal and the formation signal. The casing signal is suppressed using a device on the logging tool between the transmitter and the receiver. The suppression may be accomplished by using as the device a magnet slidably coupled to the casing thereby increasing a casing density. The signal may be generated by using a quadrupole transmitter operated below a cutoff frequency of the casing. The suppression may be accomplished by using a sensor disposed between the transmitter and the receiver that produces an output indicative of the casing signal and using the output of the sensor to operate a transducer. The suppression may be based on an estimated time of propagation of the casing signal between the transmitter and the receiver. The suppression may be done by attenuating selected frequencies in the casing signal using a segment having different diameters and/or an attached mass.

BRIEF DESCRIPTION OF THE DRAWINGS

For detailed understanding of the present disclosure, reference should be made to the following detailed description of the preferred embodiment, taken in conjunction with the accompanying drawing and in which.

DETAILED DESCRIPTION OF THE DISCLOSURE

The present disclosure is discussed with reference to specific logging instruments that may form part of a string of several logging instruments for conducting wireline logging operations. It is to be understood that the choice of the specific instruments discussed herein is not to be construed as a limitation and that the method of the present disclosure may also be used with other logging instruments as well.

Figure 1:
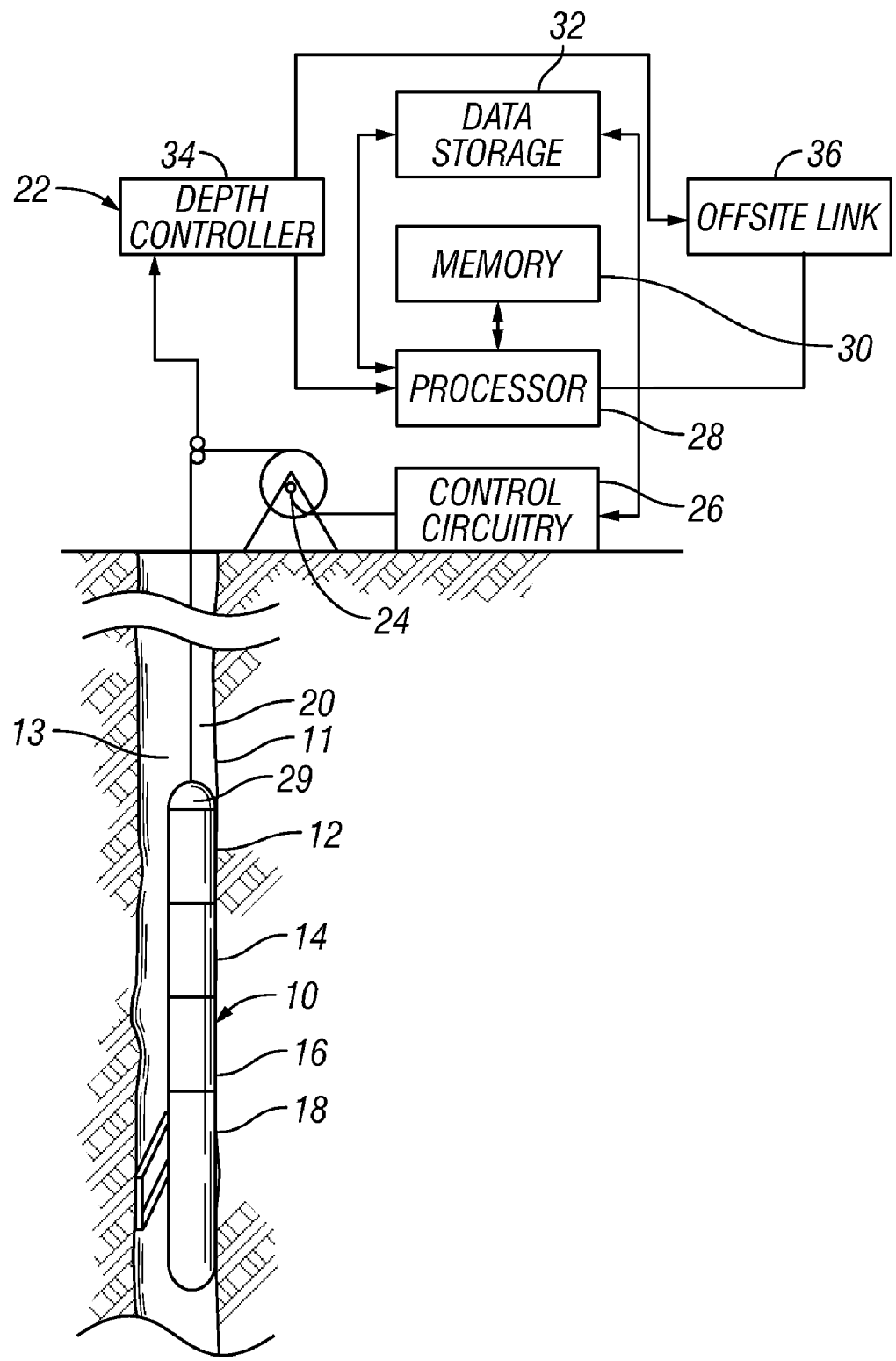
FIG. 1 is a schematic illustration of a wireline logging system.

A typical configuration of the logging system is shown in FIG. 1. This is a modification of an arrangement from U.S. Pat. No. 4,953,399 to Fertl et al., having the same assignee as the present disclosure, the contents of which are incorporated herein by reference. Shown in FIG. 1 is a suite of logging instruments 10, disposed within a borehole 11 penetrating an earth formation 13, illustrated in vertical section, and coupled to equipment at the earth's surface, in accordance with various illustrative embodiments of the method and apparatus of the present disclosure. Logging instrument suite 10 may include a resistivity device 12, a natural gamma ray device 14, and/or two porosity-determining devices, such as a neutron device 16 and/or a density device 18. Collectively, these devices and others used in the borehole for logging operations are referred to as formation evaluation sensors. The resistivity device 12 may be one of a number of different types of instruments known to the art for measuring the electrical resistivity of formations surrounding a borehole so long as such device has a relatively deep depth of investigation. For example, a HDIL (High Definition Induction Logging) device such as that described in U.S. Pat. No. 5,452,761 to Beard et al., having the same assignee as the present disclosure, the contents of which are fully incorporated herein by reference, may be used. The natural gamma ray device 14 may be of a type including a scintillation detector including a scintillation crystal cooperatively coupled to a photomultiplier tube such that when the crystal is impinged by gamma rays a succession of electrical pulses is generated, such pulses having a magnitude proportional to the energy of the impinging gamma rays. The neutron device 16 may be one of several types known to the art for using the response characteristics of the formation to neutron radiation to determine formation porosity. Such a device is essentially responsive to the neutron-moderating properties of the formation. The density device 18 may be a conventional gamma-gamma density instrument such as that described in U.S. Pat. No. 3,321,625 to Wahl, used to determine the bulk density of the formation. A downhole processor 29 may be provided at a suitable location as part of the instrument suite.

The logging instrument suite 10 is conveyed within borehole 11 by a cable 20 containing electrical conductors (not illustrated) for communicating electrical signals between the logging instrument suite 10 and the surface electronics, indicated generally at 22, located at the earth's surface. The logging devices 12, 14, 16, and/or 18 within the logging instrument suite 10 are cooperatively coupled such that electrical signals may be communicated between each of the logging devices 12, 14, 16, and/or 18 and the surface electronics 22. The cable 20 is attached to a drum 24 at the earth's surface in a manner familiar to the art. The logging instrument suite 10 is caused to traverse the borehole 11 by spooling the cable 20 on to or off of the drum 24, also in a manner familiar to the art.

The surface electronics 22 may include such electronic circuitry as is necessary to operate the logging devices 12, 14, 16, and/or 18 within the logging instrument suite 10 and to process the data therefrom. Some of the processing may be done downhole. In particular, the processing needed for making decisions on speeding up (discussed below) or slowing down the logging speed is preferably done downhole. If such processing is done downhole, then telemetry of instructions to speed up or slow down the logging could be carried out substantially in real time. This avoids potential delays that could occur if large quantities of data were to be telemetered uphole for the processing needed to make the decisions to alter the logging speed. It should be noted that with sufficiently fast communication rates, it makes no difference where the decision-making is carried out. However, with present data rates available on wirelines, the decision-making is preferably done downhole.

Control circuitry 26 contains such power supplies as are required for operation of the chosen embodiments of logging devices 12, 14, 16, and/or 18 within the logging instrument suite 10 and further contains such electronic circuitry as is necessary to process and normalize the signals from such logging devices 12, 14, 16, and/or 18 in a conventional manner to yield generally continuous records, or logs, of data pertaining to the formations surrounding the borehole 11. These logs may then be electronically stored in a data storage 32 prior to further processing. A surface processor 28 may process the measurements made by the formation evaluation sensor(s) 12, 14, 16, and/or 18. This processing could also be done by the downhole processor 29.

The surface electronics 22 may also include such equipment as will facilitate machine implementation of various illustrative embodiments of the method of the present disclosure. The surface processor 28 may be of various forms, but preferably is an appropriate digital computer programmed to process data from the logging devices 12, 14, 16, and/or 18. A memory unit 30 and the data storage unit 32 are each of a type to interface cooperatively with the surface processor 28 and/or the control circuitry 26. A depth controller 34 determines the longitudinal movement of the logging instrument suite 10 within the borehole 11 and communicates a signal representative of such movement to the surface processor 28. The logging speed is altered in accordance with speedup or slowdown signals that may be communicated from the downhole processor 29, and/or provided by the surface processor 28, as discussed below. This is done by altering the rotation speed of the drum 24. Offsite communication may be provided, for example, by a satellite link, by a telemetry unit 36.

Figure 2:
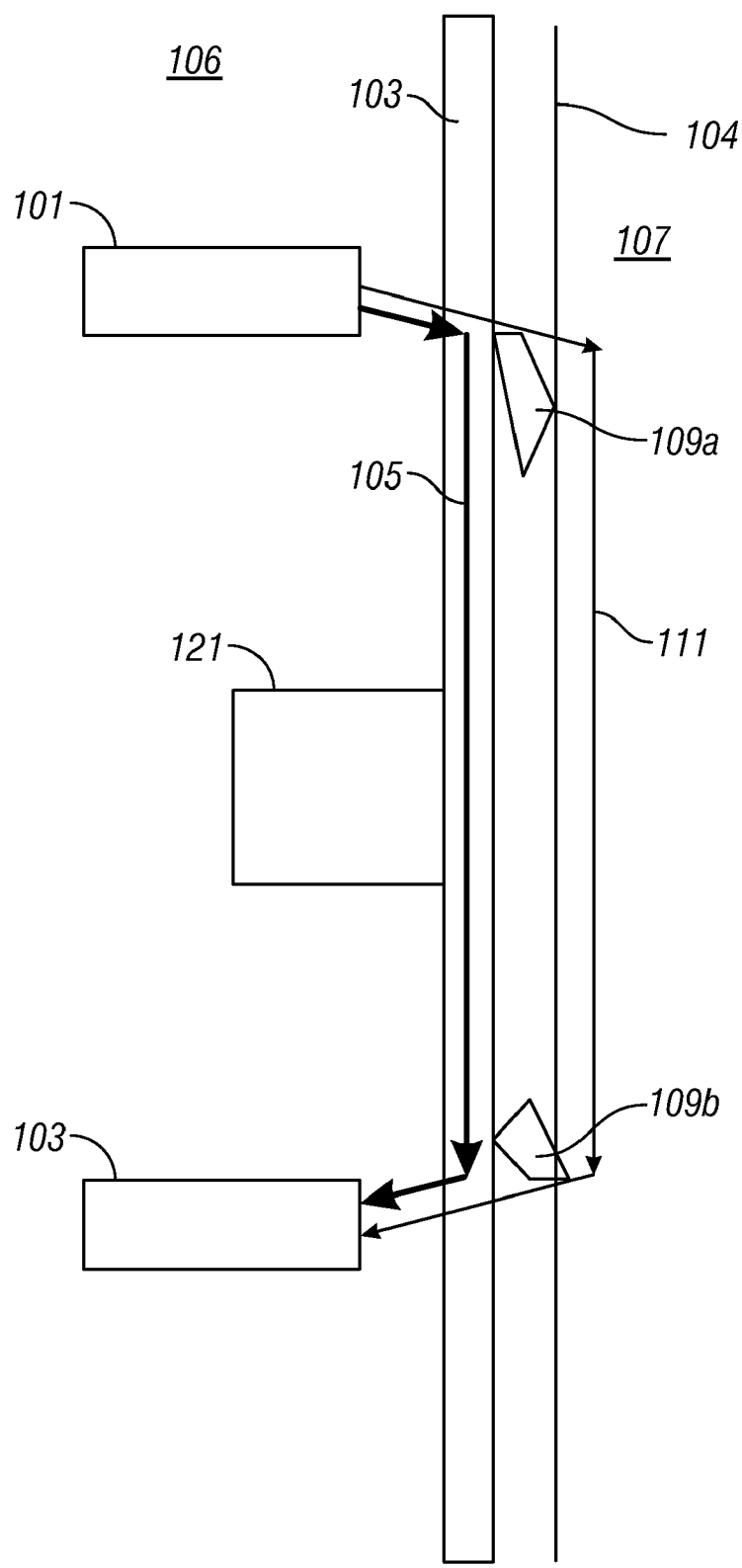
FIG. 2 is an illustration of a logging tool according to the present disclosure within a cased borehole with poor cementing.

Referring now to FIG. 2, a logging tool specific to various illustrative embodiments of the present disclosure is illustrated. The borehole in an earth formation 107 is depicted by a borehole 106 having a wall 104. Within the borehole 106 is a casing denoted by 103. In the example shown, the casing is poorly cemented to the borehole wall 104 by pieces of cement 109a, 109b. An acoustic transmitter is indicated by 101 and an acoustic receiver by 103. Additional receivers and transmitters may be used, but are not shown to simplify the illustration.

Upon activation of the acoustic transmitter, acoustic waves are propagated into the borehole and the earth formation. A raypath corresponding to a signal that propagates through the formation is depicted by 111. This is the desired signal whose traveltime gives the formation velocity. In addition, a raypath 113 propagating through the casing is also shown. The raypath 105 defines a casing signal that arrives earlier than the formation signal denoted by raypath 111. The casing signal 105 is extremely ringy and is only slowly attenuated with time. This ringiness is due to the high Q of the metal casing and may be aggravated by the situation shown in FIG. 2 where the casing is essentially free to vibrate between the support points indicated by 109a, 109b. As a result of this ringing, it is difficult to identify the signal propagating through the formation. This is illustrated in FIGS. 3A-3D.

Figure 3A:
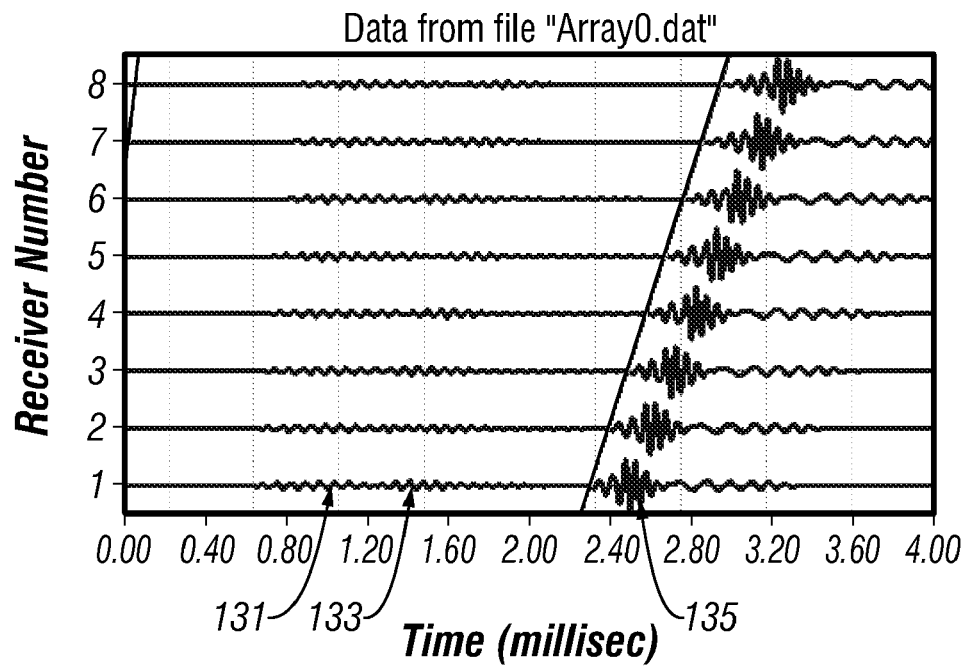
FIG. 3A shows simulation results of waveforms with a light casing in an earth formation.
Figure 3B:
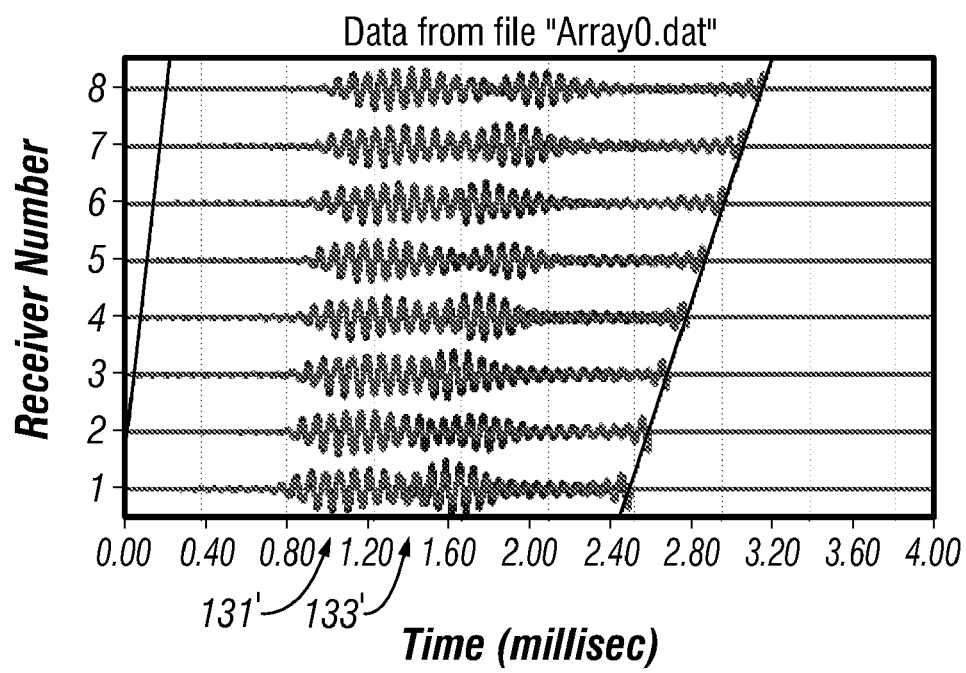
FIG. 3B shows simulation results of the waveforms of FIG. 3A after windowing and filtering.

Shown in FIG. 3A are simulated waveforms for a model in which a casing having a casing density of 7700 kg/m³ is within a borehole. It should be noted that the term casing density is defined in terms of the weight of the casing divided by the volume occupied by the casing with its ends sealed off, so that a thinner casing has a higher casing density than a thicker casing. The abscissa is time of arrival (0-4s) and the ordinate is the receiver number of the array. Signals are shown for an array of eight receivers. The formation arrival 133 and the casing arrival 131 are much weaker than the Stoneley wave arrival 135. Upon selection of a window that excludes the Stoneley wave arrival and applying a bandpass filter, the data of FIG. 3B results. The casing arrival 131' and the formation arrival 133' can now be seen, but it is also clear that the formation signal arrival is hard to identify.

Returning to FIG. 2, the present disclosure includes a magnet depicted by 121 that attached to the casing 103. The magnet 121 may be a permanent magnet or an electromagnet. The attaching of the magnet to the casing is not permanent and may be regarded as a slidable coupling, so that the logging tool can be moved along the casing using the wireline 20. Wheels (not shown) may be provided on the outside of the logging tool to facilitate movement of the tool for logging. The selection of the magnet strength is a straightforward design issue to make sure that the tension in the cable required to move the logging tool with the magnet slidably coupled to the casing does not exceed the cable strength. The effect of having the magnet coupled to the casing is to increase the mass of the casing between the transmitter 101 and the receiver 103. The effect of this increased mass of the casing can be seen in FIGS. 4A-4B.

Figure 4A:
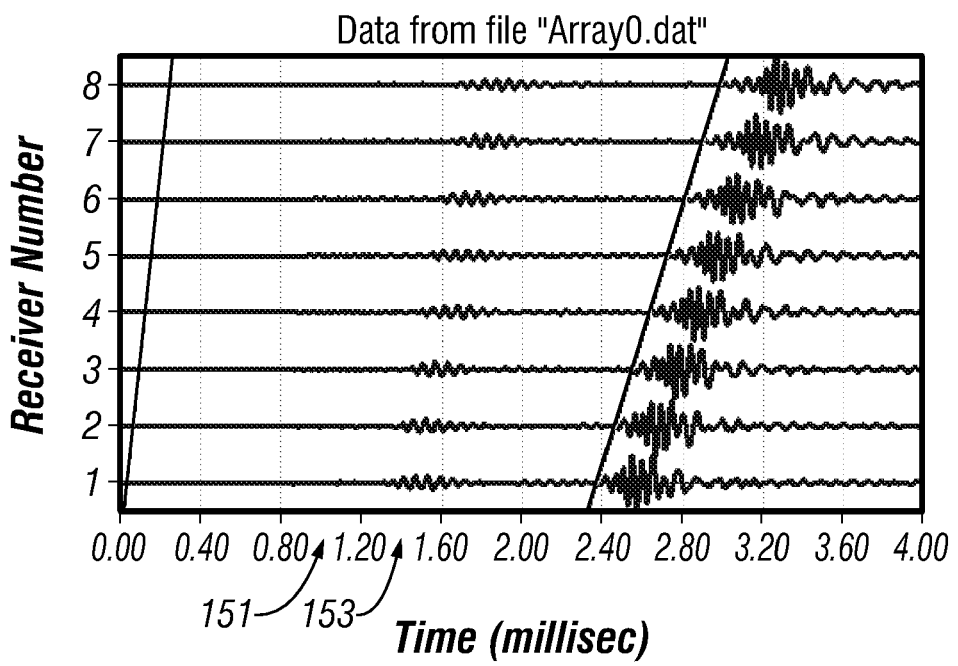
FIG. 4A shows simulation results of waveforms with a light casing in an earth formation.
Figure 4B:
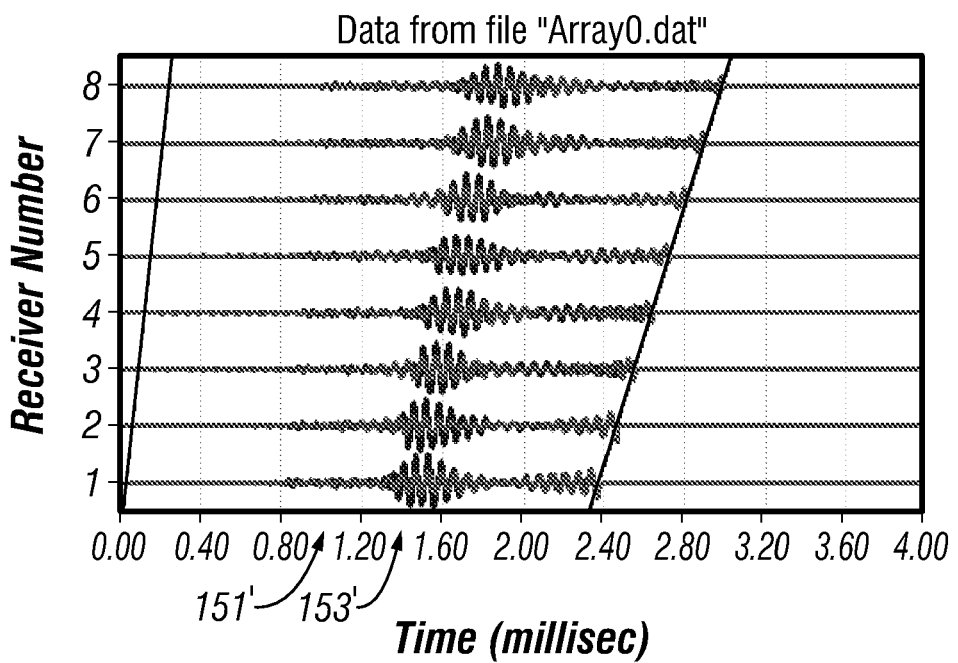
FIG. 4B shows simulation results of the waveforms of FIG. 4A after windowing and filtering.

Shown in FIG. 4A is an array display similar to FIG. 3A except that the casing density is now 77000 kg/m³, i.e., ten times the value for FIG. 3A. The formation arrival 153 is now identifiable on the raw time display while the casing arrival 151 cannot be seen. After windowing and bandpass filtering, the formation arrival 153' can be clearly identified and separate from the casing arrival 151'.

Figure 4C:
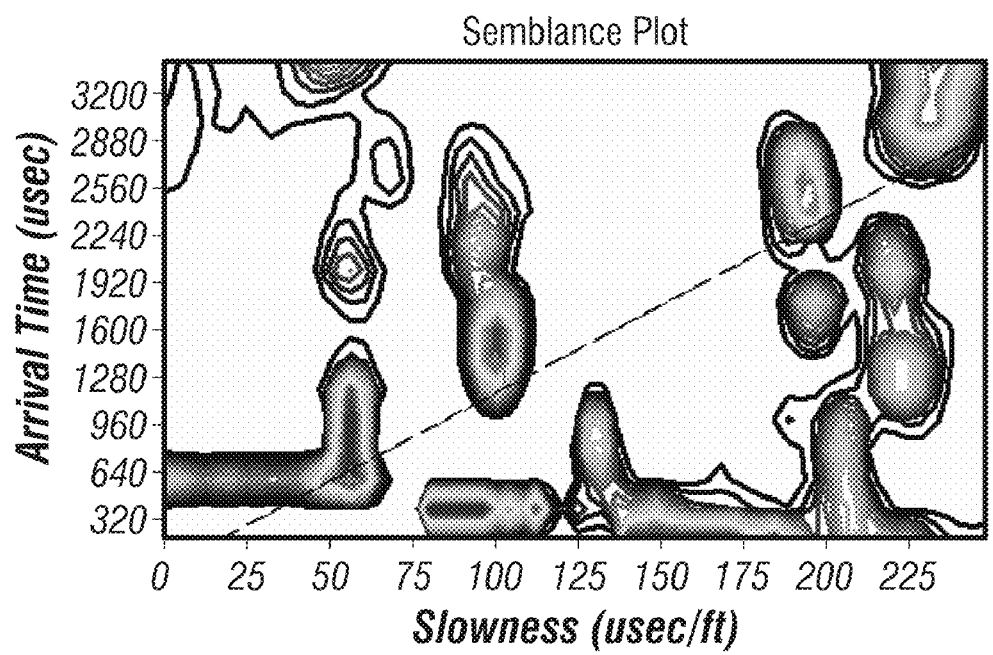
FIG. 4C shows a semblance display of the data in FIG. 4A.
Figure 4D:
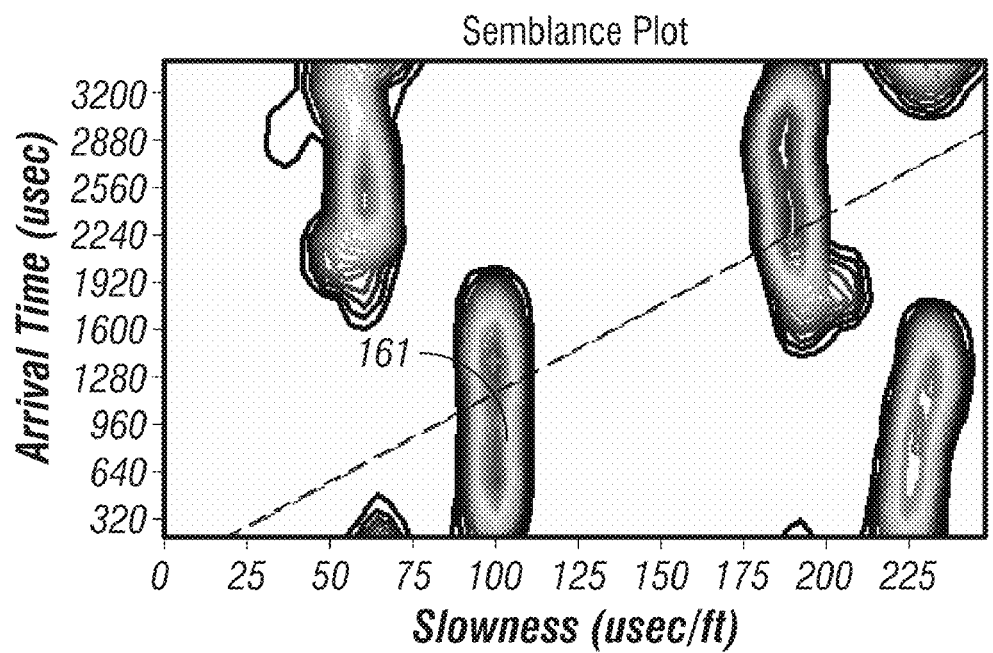
FIG. 4D shows a semblance display of the data in FIG. 4B.

FIG. 4C is a semblance display of the data of FIG. 4A in the p–τ (slowness–arrival time) domain. The abscissa is the slowness from 0-250 μs/ft (0-825 μs/m) while the ordinate is the arrival time (scale of 0-3200 ms). The peak of the semblance 161 corresponding to the formation arrival can be clearly identified with a slowness of about 105 μs/ft (velocity of 9520 ft/s or 2900 ms/s).

Figure 5A:
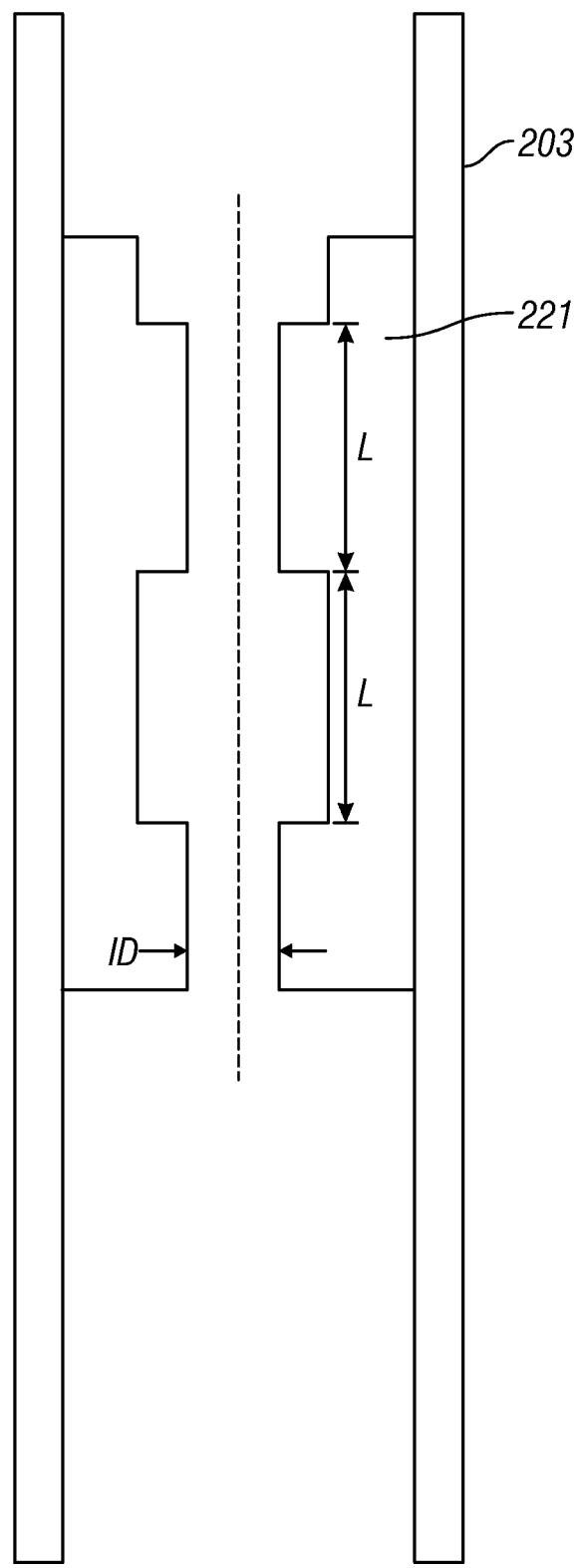
FIG. 5A shows an alternate embodiment of the present disclosure in which the magnet is provided with different internal diameters.

In another embodiment of the disclosure, the magnet 21 is part of a grooved assembly 221 with different diameters. The assembly is shown in FIG. 5A within the casing 203. The different diameter portions are selected to attenuate certain frequencies of signals propagating along the casing. Such an arrangement with different diameters has been discussed in U.S. Pat. No. 6,615,949 to Egerev et al., having the same assignee as the present disclosure and the contents of which are fully incorporated herein by reference.

Figure 5B:
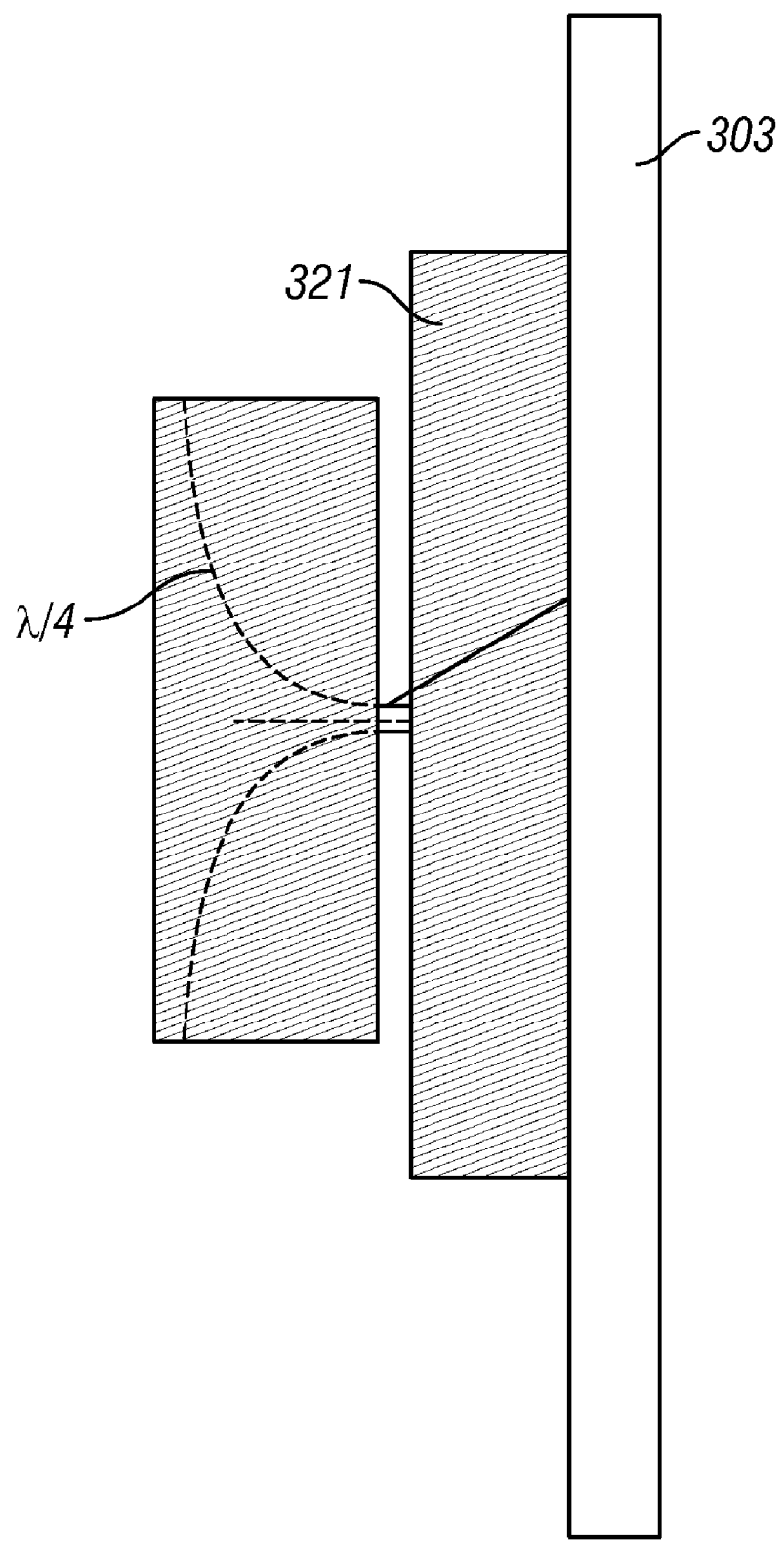
FIG. 5B shows an alternate embodiment of the present disclosure in which the magnet is provided with attached masses.

Shown in FIG. 5b is another embodiment of the disclosure in which the magnet is part of an assembly 321 having attached masses. The assembly is shown slidably coupled to casing 303. The plurality of heavy mass irregularities are spaced and sized for the maximum attenuation of acoustic pulses in a predetermined frequency range. This too is discussed in Egerev.

In another embodiment of the disclosure, instead of a monopole transmitter 101 and a monopole receiver 103 as shown in FIG. 2, multipole transmitters and receivers are used. Such a device has been taught in U.S. Pat. No. 6,850,168 to Tang et al., having the same assignee as the present disclosure and the contents of which are fully incorporated herein by reference. As disclosed in Tang, the logging tool includes a transmitter conveyed on a drilling collar for exciting a quadrupole signal in a borehole being drilled by a drill bit and a receiver for receiving the signal. The transmitter is operated at a frequency below the cut-off frequency of the quadrupole collar mode. The received signal consists primarily of the formation quadrupole mode which, at low frequencies, has a velocity that approaches the formation shear velocity. The value of the cut-off frequency is primarily dependent on the thickness of the drilling collar. The present disclosure recognizes that the casing and the slidably coupled magnet have a cut-off frequency for quadrupole waves that depends upon the casing density. By proper selection of the casing density, the arrangement described above with reference to FIG. 2, FIG. 5A or FIG. 5B can be used in conjunction with a quadrupole transmitter to determine the formation shear velocity.

The embodiment of the disclosure described above relies on passive suppression of the signal propagating through the casing that reaches the receiver. In an alternate embodiment of the disclosure, active noise cancellation of the casing signal is done. The apparatus of this embodiment of the disclosure is illustrated in FIG. 6.

Figure 6:
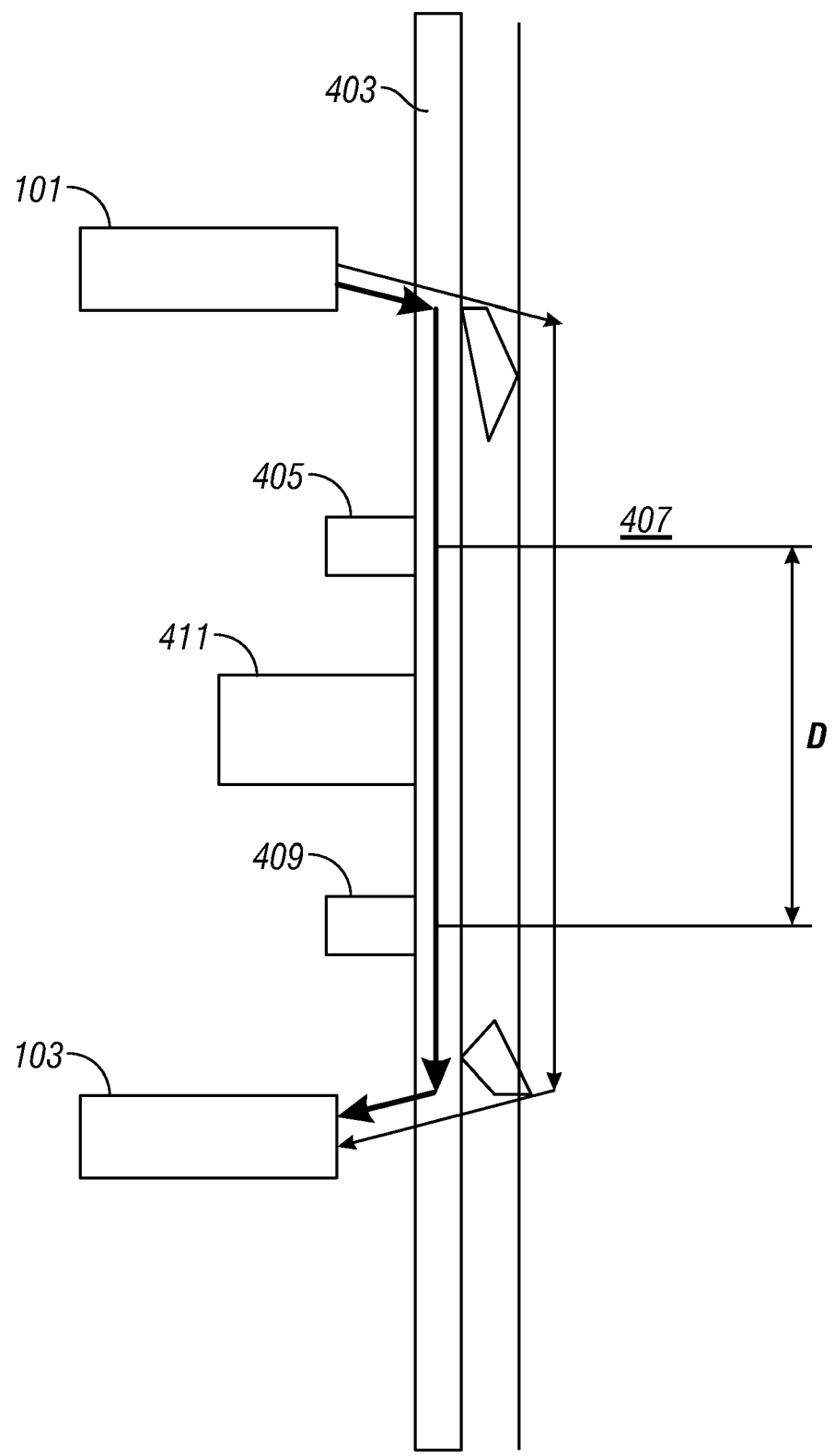
FIG. 6 shows an embodiment of the present disclosure in which active noise cancellation is used.

Shown in FIG. 6 is the formation 407 and the casing 403. The transmitter 101 and the receiver 103 are as indicated. Again, it should be noted that only a single transmitter-receiver combination is shown—in reality an array of receivers (or an array of transmitters) may be used. The apparatus includes a first sensor 405 and a second sensor 409 positioned between the transmitter 101 and the receiver 103. The first and second sensors are part of the logging tool that is slidably coupled to the casing 403. Between the first sensor 405 and a second sensor 409 is an electromechanical acoustic transducer (EMAT) 411 that is also slidably coupled to the casing 404.

During operation, when the transmitter 101 is activated, as discussed above, a signal propagates through the casing (see raypath 105 in FIG. 2). The first sensor 405 detects the casing signal. The measured signal at the first sensor is used to activate, after a specified time delay discussed below, the EMAT 411. The EMAT 411 is activated to produce a signal in the casing 403 that is equal and opposite to the signal detected at the first sensor 405, thus substantially canceling any casing signal below the EMAT.

The time delay τ mentioned above is determined from the distance D between the first sensor 405 and the EMAT 411 and the velocity of sound c in the casing. The velocity of sound in the casing is a known quantity, so that the time delay is a known quantity. The relationship is given by τ=D/c.

To correct for any discrepancies in the time delay due to incorrect knowledge of either c or D, the disclosure includes the second sensor 409 which measures the casing signal that is still propagating along the casing towards the receiver 103. The output of the second sensor is an indication of incomplete cancellation of the casing signal by the EMAT and is used through suitable circuitry (not shown) to control the time delay and/or the amplitude of the signal generated by the EMAT.

Figure 7:
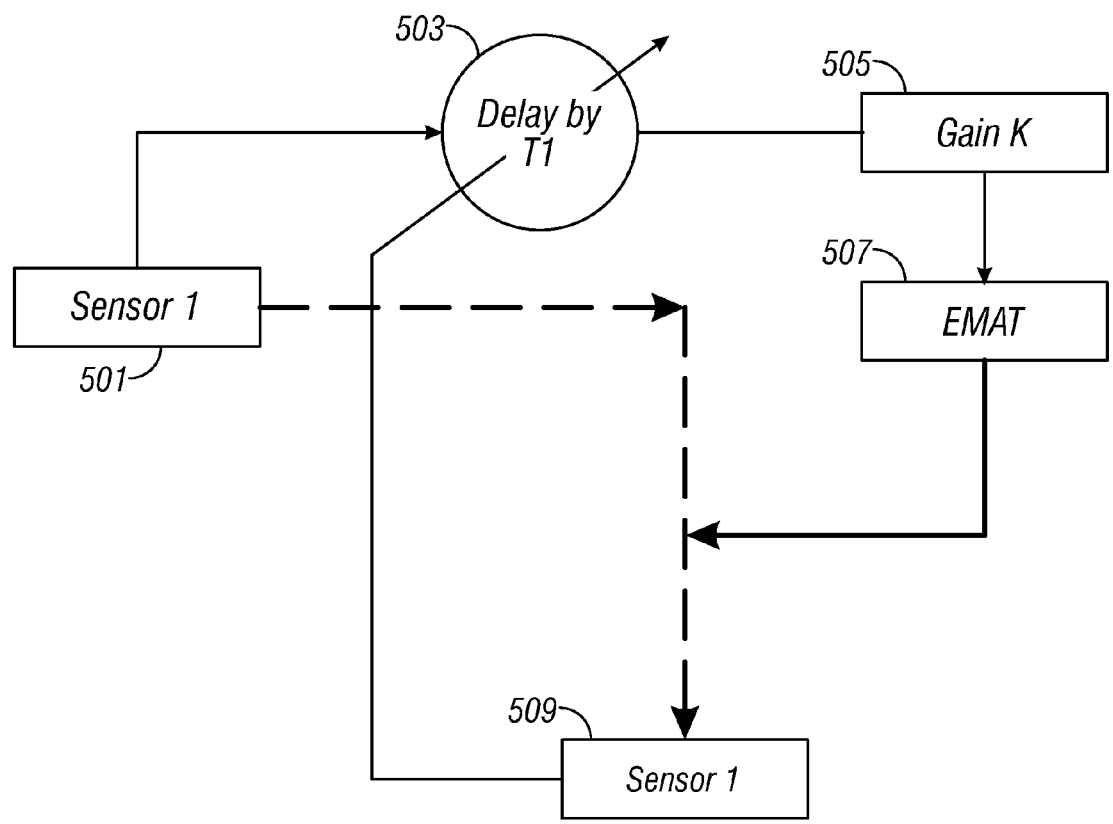
FIG. 7 is a circuit diagram representing FIG. 6.

FIG. 7 shows a schematic diagram of the operation of the tool. Signals propagating along the casing are denoted by the dashed heavy line. The first sensor 501 measures the casing signal. After a time delay τ 503 and with a suitable gain K 505, the EMAT 507 is activated. The output of the EMAT is coupled into the casing and the remaining casing signal is detected by the second sensor 509. The output of the second sensor is then used to control the time delay 503 and or the gain K.

EMATs are devices that can be used to excited or receive ultrasonic waves in an electrically conductive material such as casing. When a wire, placed near to the surface of casing, is driven by an alternating current at a desired frequency, eddy currents are induced in the casing by electromagnetic induction. In the presence of a static magnetic field ($B_0$), these induced eddy currents (J) will experience a Lorenz forces (f) given by $f=J \times B_0$
These Lorentz forces are transmitted into the casing and serve as a source of ultrasonic waves. EMATs are reciprocal devices i.e. they can be used as transmitters or as receivers of ultrasound. There is no requirement for contact, so that problems associated with acoustic coupling to casing do not arise. Those versed in the art would recognize that the disclosure described above with reference to FIGS. 6 and 7 could also be practiced with piezoelectric transducers (instead of EMATs).

The processing of the measurements may be done by the surface processor 28, by the downhole processor 29, or at a remote location. The data acquisition may be controlled at least in part by the downhole electronics. The processing that may be done may include a semblance analysis of array data such as that shown in FIGS. 4A-4D for determination of compressional- and shear-wave velocities of formations. Determination of compressional- and shear-wave velocities of formations is part of the evaluation of the earth formation that may be carried out by the present disclosure. Implicit in the control and processing of the data is the use of a computer program on a suitable machine readable-medium that enables the processors to perform the control and processing. The machine-readable medium may include ROMs, EPROMs, EEPROMs, flash memories and optical disks. The term processor is intended to include devices such as a field programmable gate array (FPGA).

While the foregoing disclosure is directed to specific embodiments of the present disclosure, various modifications will be apparent to those skilled in the art. It is intended that all variations within the scope of the appended claims be embraced by the foregoing disclosure.

What is claimed is:

1. An apparatus configured to evaluate an earth formation having a cased borehole, the apparatus comprising:
   an acoustic transmitter on a logging tool configured to be conveyed in the borehole, the transmitter configured to generate an acoustic signal that propagates through casing (casing signal) and through the formation (formation signal);
   at least one receiver on the logging tool configured to be responsive to the casing signal and the formation signal; and
   a magnet on the logging tool disposed between the transmitter and the at least one receiver, the magnet being slidably coupled to the casing and configured to suppress the casing signal at the location of the at least one receiver by increasing a density of the casing.

2. The apparatus of claim 1 wherein the magnet further comprises at least one of (i) a segment having different diameters, and (ii) at least one attached mass.

3. The apparatus of claim 1 wherein the transmitter comprises a quadrupole transmitter and the at least one receiver comprises a quadrupole receiver, and wherein the transmitter is configured to be operated below a cut-off frequency of the casing.

4. The apparatus of claim 1 wherein the at least one receiver comprises a plurality of receivers, the apparatus further comprising a processor configured to use an output of the plurality of receivers to estimate at least one of (i) a compressional-wave velocity of the formation, and (ii) a shear-wave velocity of the formation.

5. A method of evaluating an earth formation having a cased borehole, the method comprising:
   generating an acoustic signal that propagates through casing (casing signal) and through the formation (formation signal) using an acoustic transmitter on a logging tool;
   using at least one receiver on the logging tool to produce an output responsive to the casing signal and the formation signal; and
   positioning a magnet on the logging tool between the transmitter and the at least one receiver and using the magnet for suppressing the casing signal at a location of the at least one receiver by increasing a density of the casing.

6. The method of claim 5 further comprising attenuating selected frequencies in the casing signal by providing the magnet with at least one of (A) a segment having different diameters, and (B) at least one attached mass.

7. The method of claim 5 further comprising using, as the transmitter, a quadrupole transmitter and using, as the at least one receiver, a quadrupole receiver, the method further comprising generating the acoustic signal below a cut-off frequency of the casing.

8. The method of claim 5 further comprising using, as the at least one receiver, a plurality of receivers, the method further comprising using outputs of the plurality of receivers to estimate at least one of (i) a compressional-wave velocity of the formation, and (ii) a shear-wave velocity of the formation.

\* \* \* \* \*